United States Patent [19]

Minz et al.

[11] Patent Number: 4,556,463
[45] Date of Patent: Dec. 3, 1985

[54] PROCESS FOR REMOVING SULPHATE FROM ELECTROLYSTS BRINE

[75] Inventors: Franz-Rudolf Minz, Dormagen; Sandor Vajna, Bonn, both of Fed. Rep. of Germany

[73] Assignee: Bayer Aktiengesellschaft, Fed. Rep. of Germany

[21] Appl. No.: 678,095

[22] Filed: Dec. 4, 1984

[30] Foreign Application Priority Data

Dec. 20, 1983 [DE] Fed. Rep. of Germany ....... 3345898

[51] Int. Cl.$^4$ ............... C25B 1/16; C25B 1/00; C02F 1/46
[52] U.S. Cl. ............... 204/98; 204/128; 210/670; 210/683; 210/685; 210/724
[58] Field of Search ............... 204/98, 128; 210/660, 210/670, 681, 683, 685–687, 724

[56] References Cited

U.S. PATENT DOCUMENTS

| | | | |
|---|---|---|---|
| 2,559,529 | 7/1951 | Bauman | 210/683 |
| 2,606,098 | 8/1952 | Bauman | 210/683 |
| 2,789,036 | 8/1957 | Tillman | 210/683 |
| 3,186,940 | 6/1965 | Vajna | 210/685 |
| 3,842,002 | 10/1974 | Boari | 210/685 |
| 3,970,528 | 7/1976 | Zirngiebl et al. | 204/128 |
| 4,078,978 | 3/1978 | Zirngiebl | 204/98 |
| 4,445,987 | 5/1984 | Benedetto | 204/151 |
| 4,470,891 | 9/1984 | Moore et al. | 204/98 |
| 4,488,949 | 12/1984 | Lee et al. | 210/683 |

FOREIGN PATENT DOCUMENTS 2448531 4/1976 Fed. Rep. of Germany ........ 204/98

Primary Examiner—John F. Niebling
Assistant Examiner—Terryence Chapman
Attorney, Agent, or Firm—Connolly and Hutz

[57] ABSTRACT

Sulfate impurities are removed from alkali metal chloride brine electrolysis cell effluent by diluting the effluent to an alkali metal chloride content of less than 150 grams per liter and then contacting the diluted effluent with a weakly basic anion exchange medium.

7 Claims, 2 Drawing Figures

PROCESS FOR REMOVING SULPHATE FROM ELECTROLYSTS BRINE

BACKGROUND OF THE INVENTION

The electrolytic production of chlorine, alkali metal hydroxide liquor and hydrogen from alkali metal chloride involves the use of naturally-occurring salts which necessitates removal of the accompanying impurities. For example, where rock salt is used in an electrolysis cell having a closed brine circuit, the polyvalent cations present in the salt have to be removed by alkaline or carbonate precipitation and the sulphate ions by precipitation with barium or calcium, for example. Detailed information on the electrolysis process and on brine purification may be found in the publication by Hund & Minz entitled "Chlor, Alkalien und anorganische Chlorverbindungen (Chlorine, Alkalis and Inorganic Chlorine Compounds)" in Winnacker, Kuchler, "Chemische Technologie", Vol. 2 "Anorganische Technologie I" pages 379–424, more particularly pages 421–424, and also in the secondary literature cited therein, or in J.S. Sconce: Chlorine. p. 135 ff (1962).

The present invention relates specifically to a process for removing sulphate ions from an alkali metal chloride brine in membrane electrolysis using ion exchangers.

Previously, even the most selective ion exchangers were unable to remove sulphate ions from a concentrated alkali metal chloride solution. The so-called "weak brine" effluent flowing from the electrolysis cell also contains a concentration of alkali metal chloride (approximately 200 g of alkali metal chloride per liter) which is too high to obtain a satisfactory ion exchanging effect. By contrast, highly concentrated alkali metal chloride solutions are suitable for removing sulphate ions from an ion exchanger charged with sulphate ions and thereby regenerating the ion exchanger.

In membrane electrolysis, the brine circuit is not completely closed with regard to water. As they pass through the membrane, sodium ions remove water from the anode compartment in the form of a hydrate shell. This hydrate water and the water discharged from the cell as water vapor with the gaseous chlorine needs to be returned to the circuit to maintain the necessary brine volume.

BRIEF DESCRIPTION OF THE INVENTION

It has now been found that a component stream of the "weak brine" leaving the electrolysis cell may be diluted with the quantity of water required for the circuit as a whole to such an extent that a weakly basic ion exchanger is capable of removing the entire quantity of sulphate introduced into the circuit with the salt.

DETAILED DESCRIPTION

The present invention relates to a process for removing sulphate from the brine circuit in a continuous alkali metal chloride membrane electrolysis, characterized in that a component stream of the circulating brine is diluted to an alkali metal chloride concentration of less than 150 g/l, preferably from 90 to 120 g/l and the dilute brine is passed through a weakly acidic ion exchanger to remove the sulphate. Thereafter, the sulfate-free dilute brine is returned to the circuit. After the ion exchanger is charged with sulfate ion, it is regenerated by contacting with alkali metal chloride solution having a concentration of more than 280 g/l and then sulfate may be precipitated from the regeneration solution by cooling-induced crystallization as alkali metal sulfate or by addition of $Ca^{++}$-ions (e.g. in the form of $CaCl_2$ or $CaCO_3$) as glauberite or $CaSO_4$.

Suitable ion exchangers are weakly basic anion exchangers based on styrene or acrylate. Ion exchangers of this type are well known and described, for example, in Ullmanns Ezyklopadie der technischen Chemie, Vol. 13, pages 279–346, more especially pages 295–308. The ion exchanger is preferably introduced into an ion exchange column in bead or granulate form. The particles may be from 0.5 to 5 mm, preferably from about 1 to 2 mm, in diameter. The height of the ion exchange packing in the direction of flow may be from 1 to 2 meters. The contact time between the diluted brine and the ion exchanger is selected in such a way that from 5 to 20 times, preferably of the order of 10 times, the volume of brine, based on the volume of the ion exchange column, is contacted with the ion exchanger every hour.

The brine should have a pH of from 2 to 4, preferably of the order of 3. The pH is preferably adjusted by the addition of hydrochloric acid, but other acids are also suitable.

The diluted, substantially sulphate-free brine leaving the ion exchange column is returned to the brine circuit. The brine is then reconcentrated by the dissolution of solid salt and subjected to the conventional purification process for the removal of polyvalent cations before being charged into the electrolysis cell.

When the ion exchanger is charged with sulphate ions, i.e. when the sulphate content of the diluted brine flowing from the ion exchange column begins to increase (sulphate ions "break through"), input of the diluted brine is interrupted and the ion exchanger is regenerated. To this end, alkali metal chloride solution having a concentration of more than 280 g/l, preferably more than 300 g/l, of alkali metal chloride is passed through the ion exchanger. The highly concentrated solution takes up sulphate ions from the ion exchanger. Initially the regenerate solution flowing from the ion exchanger contains more than 20 g of sodium sulphate per liter. When the alkali metal sulphate content of that solution falls to a value of from 12 to 16 g/l, the ion exchanger is regenerated and may again be re-used for removing sulphate ions from dilute alkali metal chloride brine.

The regenerate solution obtained has an average alkali metal sulphate content of from 15 to 18 g of alkali metal sulphate per liter. This regenerate solution is according to one embodiment of the invention delivered to a cooling crystallizer where it is cooled to temperatures of, for example, from $-5°$ to $-10°$ C. As a result, alkali metal sulphate crystallizes out. For example, the solubility of sodium sulphate in a sodium chloride solution containing 240 g of sodium chloride per liter amounts to only 5 g/l at $-10°$ C. and to approximately 9 g/l at $-5°$ C. Sodium sulphate decahydrate ($Na_2SO_4.10H_2O$) crystallizes out from such a solution in saleable form. The alkali metal sulphate hydrate crystals are separated from the cooled regeneration solution. The mother liquor may either be reconcentrated and recirculalted to regenerate the ion exchanger again or may be introduced into the brine circuit.

BRIEF DESCRIPTION OF THE DRAWINGS

The process according to the present invention is described in detail below with reference to the accompanying drawings wherein.

The following example described in conjunction with the drawings illustrates the manner in which the process of the claimed invention may be carried out.

Example

Figure 1:
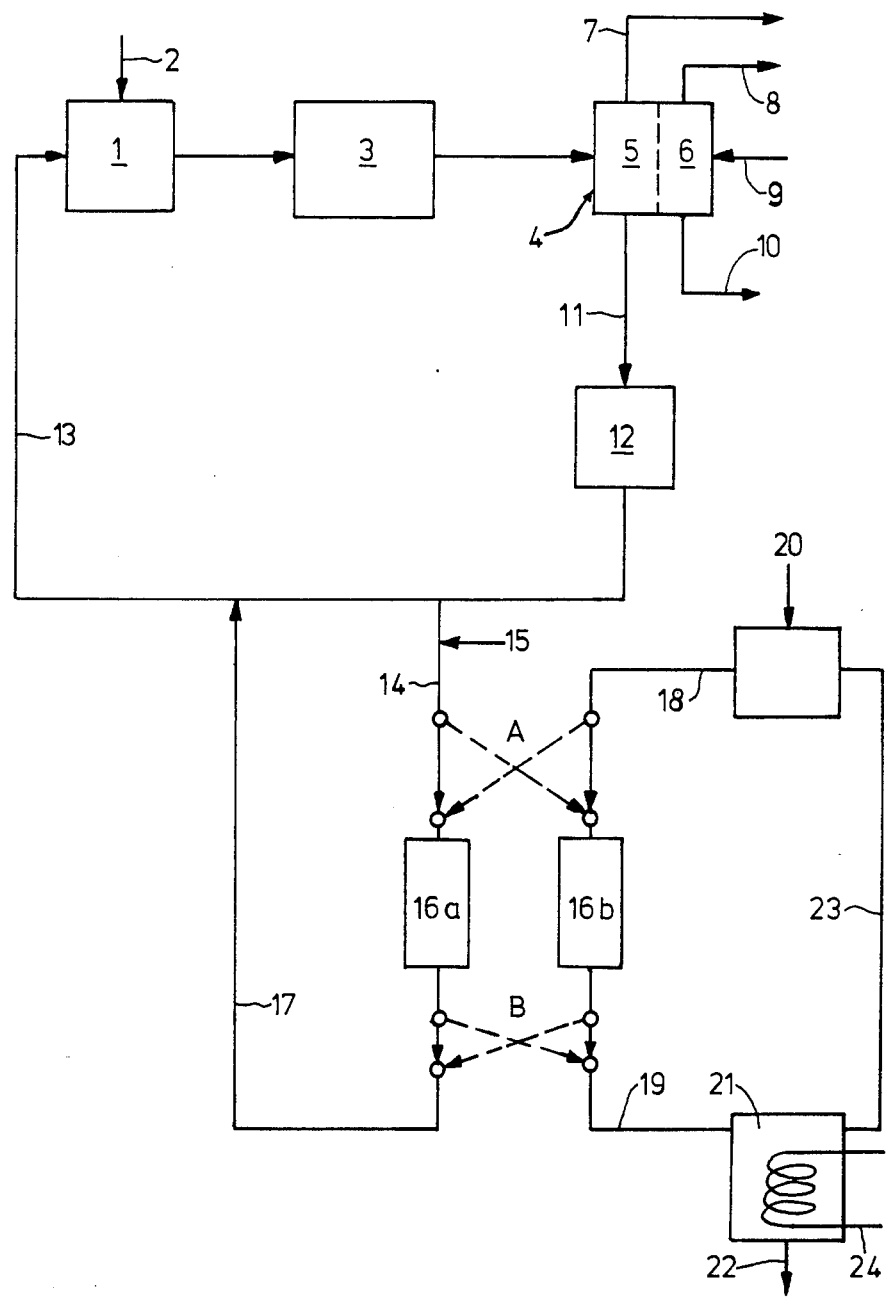
FIG. 1 illustrates a flow diagram for the process according to the present invention and FIG. 2 illustrates an alternative flow diagram for the process according to the present invention using a modified ion exchange regeneration.

FIG. 1 illustrates delivery of natural sodium chloride salt 2 and recirculated brine through a pipe 13 to a salt dissolving station 1. The brine obtained is, for example, a sodium chloride brine containing 300 g/l of sodium chloride and 5 g/l of sodium sulphate. This concentrated brine is delivered to a purifying station 3 to remove polyvalent ions, such as calcium, magnesium and other impurities. The purified brine is delivered to the anode compartment 5 of a membrane electrolysis cell 4. A "weak" brine is run off through the pipe 11. A volume of, for example, 0.68 m³ of weak brine containing 200 g of sodium chloride per liter and 7.3 g of sodium sulphate per liter is formed per cubic meter of brine introduced. In addition, the electrolysis product, chlorine 7, is formed in the anode compartment. The electrolysis products sodium hydroxide 10 and hydrogen 8 are formed in the cathode compartment 6 separated from the anode compartment 5 by a membrane. To maintain a sodium hydroxide content tolerable to the membrane in the cathode compartment 6, water 9 is introduced.

The brine flowing off through 11 is acidified by the addition of hydrochloric acid, and subjected to dechlorination at 12 being returned to the salt dissolving station through the pipe 13. In accordance with the figures used in the example, therefore, 164 kg of sodium chloride and 255 liters of water have to be replaced per cubic meter of brine delivered to the electrolysis cell. By dissolving salt containing, for example, 1% by weight, of sulphate expressed as sodium sulphate, 1.66 kg of sodium sulphate are entrained into the circulated brine per cubic meter of brine delivered to the electrolysis cell. To remove this entrained sulphate, a component stream of for example 0.23 m³ of the weak brine (per cubic meter of brine delivered to the electrolysis cell) is branched off through the pipe 14. The weak brine is diluted by the addition of water through pipe 15 to a concentration of 100 g of sodium chloride per liter. After passage through the ion exchanger 16a, a substantially sulphate-free (content less than 0.1 g/l) of sodium chloride solution is returned through pipe 17 to the main brine stream.

To guarantee continuous operation, at least two ion exchanger columns 16a and 16b are preferably provided, being used alternately for removing sulphate and for regeneration. The respective functions of the ion exchanger columns 16a and 16b may be switched through the valves A and B. Accordingly, while the ion exchange column 16a is being used to remove sulphate, the ion exchange column 16b is being regenerated. To this end, a sodium chloride solution containing for example, 300 g of sodium chloride per liter is introduced through the pipe 18. Initially, the regeneration solution issuing from the ion exchange column has a sulphate content of more than 20 g/l. The input of regeneration solutions is interrupted when the sulphate content falls to a level of from 12 to 16 g/l. The ion exchanger may then be re-used for removing sulphate.

The regenerate solution flowing off is delivered to a cooling crystallizer 21, for example having an average sodium sulphate content of 18 g per liter. Sodium sulphate decahydrate ($Na_2SO_4.10H_2O$) crystallizes out and is filtered off and removed from the circuit (22). On cooling to $-10°$ C., for example, the mother liquor still contains 5 g of sodium sulphate per liter. It may be returned through the pipe 23 and reconcentrated, sodium chloride (20) being dissolved. For the quantities and concentrations mentioned by way of example in the foregoing, a volume of, for example, 0.128 m³ of regeneration solution containing 300 g of sodium chloride per liter and 5 g of sodium sulphate per liter is delivered through pipe 18 to the ion exchanger 16b. The regenerate solution flowing off then has a content of approximately 280 g/l of sodium chloride and 18 g/l of sodium sulphate. 3.76 kg of $Na_2SO.10H_2O$ are obtained on cooling to $-10°$ C. in the cooling crystallizer, corresponding to the removal of 1.66 kg of $Na_2SO_4$ from the circuit.

Figure 2:
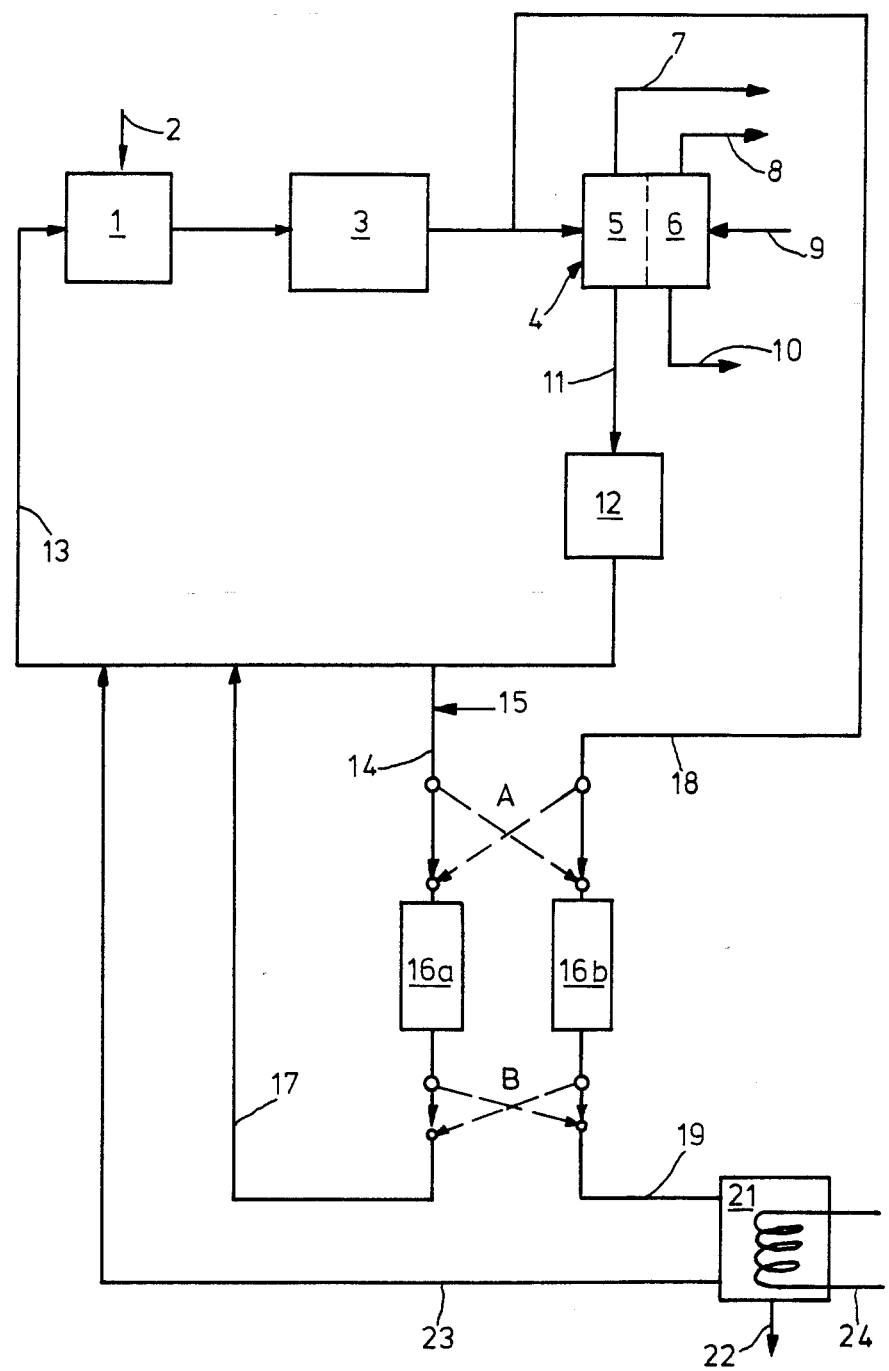

FIG. 2 shows an alternative embodiment of the process according to the present invention in which the regeneration solution is not circulated in a separate circuit, but instead, for regeneration, resaturated and purified sodium chloride brine is removed through pipe 18 after the brine purifying station 3 and the mother liquor obtained after cooling-induced crystallization is returned through pipe 23 to the brine circuit.

Aside from the specific example described above, many different embodiments of the present invention may be made without departing from the spirit and scope thereof, but it is to be understood that this invention is not limited to the specific embodiments exemplified except as defined in the appended claims.

What is claimed is:

1. In the continous process of electrolysis of alkali metal chloride brine containing sulfate ion impurities wherein the brine is added to an anode compartment of an electrolysis cell and a spent weak brine is removed therefrom, reconcentrated with alkali metal chloride and recycled to the cell, the improvement according to which comprises removing sulfate ion impurity from the spent weak brine by diluting the weak brine to an alkali metal chloride content of less than 150 grams per liter, passing the diluted weak brine through a weakly basic anion exchange medium to remove sulfate ions, and recycling the treated weak brine to the electrolysis cell after concentration with alkali metal chloride.

2. The process according to claim 1 wherein the diluted weak brine solution delivered to the anion exchange medium has a pH value of from 2 to 4.

3. The process according to claim 1 wherein the weak brine is diluted to an alkali metal chloride content of 120 grams per liter or less.

4. The process according to claim 1 wherein the treated weak brine obtained from the anion exchange medium contains less than 0.1 grams per liter of sulfate salt.

5. The process according to claim 1 wherein the brine delivered to the electrolysis cell and the weak brine each has a sulfate salt content of from 4 to 8 grams per liter.

6. The process according to claim 1 wherein the sulfate is removed and recovered from the basic ion exchange medium by contacting the sulfate containing ion exchange medium with an alkali metal chloride solution containing at least 280 grams per liter alkali metal chloride and then precipitating removed sulfate salt from the solution by cooling-induced precipitation and/or by addition of Ca-ions.

7. The process according to claim 6 wherein alkali metal chloride solution containing the ion exchange medium has a pH value of 2 to 4.

* * * * *